United States Patent [19]

Leiber

[11] Patent Number: 4,763,262
[45] Date of Patent: Aug. 9, 1988

[54] PROPULSION CONTROL USING LONGITUDINAL ACCELERATION, STEERING ANGLE, AND SPEED TO SELECT SLIP THRESHOLD

[75] Inventor: Heinz Leiber, Oberriexingen, Fed. Rep. of Germany

[73] Assignee: Daimler-Benz Aktiengesellschaft, Stuttgart, Fed. Rep. of Germany

[21] Appl. No.: 943,693

[22] Filed: Dec. 19, 1986

[30] Foreign Application Priority Data

Dec. 21, 1985 [DE] Fed. Rep. of Germany ....... 3545652

[51] Int. Cl.[4] .............................................. B60T 8/32
[52] U.S. Cl. ................................... 364/426; 180/197; 303/100
[58] Field of Search .......................... 364/426, 431.07; 180/197; 361/238; 303/95, 97, 100

[56] References Cited

U.S. PATENT DOCUMENTS

| | | | |
|---|---|---|---|
| 3,910,647 | 10/1975 | Takeuchi | 180/197 |
| 4,036,536 | 7/1977 | Quon | 303/97 |
| 4,042,059 | 8/1977 | Bertolasi | 303/100 |
| 4,484,280 | 11/1984 | Brugger et al. | 364/426 |
| 4,511,014 | 4/1985 | Makita | 180/197 |
| 4,657,313 | 4/1987 | Fennel et al. | 303/100 |

Primary Examiner—Gary Chin
Attorney, Agent, or Firm—Barnes & Thornburg

[57] ABSTRACT

A propulsion control system for motor vehicles for preventing an undesirable spinning of the driven vehicle wheels when their slip exceeds a certain threshold value, having several slip thresholds that are connected or disconnected by a logic circuit as a function of the vehicle speed, the longitudinal acceleration, the steering angle and control signals of the propulsion control. The logic circuit may also be used for changing the rising and adjusting speeds of the control elements of the propulsion control.

16 Claims, 1 Drawing Sheet

PROPULSION CONTROL USING LONGITUDINAL ACCELERATION, STEERING ANGLE, AND SPEED TO SELECT SLIP THRESHOLD

BACKGROUND AND SUMMARY OF THE INVENTION

The invention relates to a propulsion control system for motor vehicles or the type shown in U.S. Pat. No. 4,484,280.

It concerns a wheel slip control (ASR) for the driven wheels of a vehicle having a driven axle, a slip comparator being assigned to each of these wheels. If one driven wheel exceeds a given slip value, this wheel is braked. If both driven wheels exceed this slip value, output torque of the vehicle engine is reduced. In one variation, the torque is reduced if only one drive wheel is spinning.

Because of the fixed slip threshold value, a wheel slip control occurs earlier than required. As a result of the differing rotational speeds of the vehicle wheels during turning, these slip values are reached much earlier than in the case of straight-ahead driving. Also, the road condition and the relationship between the road and the vehicle are not taken into account.

It is therefore the objective of the invention to improve the known system to the extent that the slip threshold values are adapted better to momentary conditions and adhesion coefficient or the moment that can be transferred to the road, and to the extent that the control is refined.

The advantages of the invention are that the measured longitudinal acceleration in connection with the working propulsion control exhibits a rough relationship to the adhesion coefficient and can therefore be used as an auxiliary signal. Particularly in the case of all-wheel driven vehicles having an ASR, this interrelationship is rather exact and is essentially erroneous due to the diagonal position in longitudinal direction of the vehicle coordinates during turning. During turning, in addition to the diagonal position of the vehicle coordinates, the loading of the vehicle also enters into the precision of the measurements. In both cases, however, the measuring of the longitudinal acceleration alone is sufficient, if the steering angle is also used in logic processes to select the threshold value of the wheel slip control. In this case, particularly the possibility is considered of changing the switching thresholds of control signals, such as positive and negative wheel accelerations and the like, to the extent that such control signals are used in the propulsion control system.

Another advantage of the use of the longitudinal acceleration signal is the fact that it can be used for the changing of the rate of adjusting the brake pressure for the ASR-controlled wheels and the power control element of the vehicle engine. In the case of low longitudinal acceleration, the falling of the brake pressure and the rerising of the engine torque, after an ASR-intervention, take place slowly, so that the controlled wheel with the low torque excess is guided in the direction of the stable area. In the case of a high longitudinal acceleration, and thus higher adhesion coefficients, the rate of adjusting may be considerably higher because in this case, also in the case of powerful engines, the excess amount is not too high. This control has special advantages in the case of inhomogeneous roads, particularly when so-called $\mu$-jumps occur, because then the ASR-system becomes operative for a short time. The longitudinal acceleration, with corresponding additional expenditures, may also be derived from a driving speed sensor. Sensors are known that work according to the Doppler radar principle or optical correlation. Also, with a compromise in regard to precision, the longitudinal acceleration can be derived from the change of the averaged wheel speeds with respect to time.

The circuitry according to the present invention to produce this object include two additional slip comparators, one corresponding to a lower and one to a higher indicated threshold value for each driven wheel and an additional longitudinal acceleration comparator adjusted to an indicated higher threshold value. A logic circuit is provided for alternatively actuating one of the three slip comparators when certain combination is present of:

(a) the output signal of the speed comparator, (b) one of the longitudinal acceleration comparators, and (c) steering angle comparator as well as an input signal of the actuating device for the wheel brakes and of the actuating device for the control element affecting the engine torque.

The lower threshold slip comparator is actuated when signals are simultaneously present from the speed comparator, from the longitudinal acceleration with the higher threshold and not from the longitudinal acceleration with the lower threshold, from the steering angle comparator and from at least one of the actuating devices. The higher threshold slip comparator is actuated when the output signals are simultaneously present form the steering angle comparator and from the longitudinal acceleration with the higher threshold value. The slip comparator with the medium threshold value is actuated when actuating signals are not present for the other two slip comparators. The speed of change of the brake pressure and of the adjusting speed of the power control element for the vehicle engine is adjusted if output signals are simultaneously present from the speed comparator, from the longitudinal acceleration comparator having the higher threshold value and at least one of the actuating devices.

Other objects, advantages and novel features of the present invention will become apparent from the following detailed description of the invention when considered in conjunction with the accompanying drawings.

BRIEF DESCRIPTION OF THE DRAWINGS

The FIGURE is a block diagram of a propulsion system for a motor vehicle incorporating the principles of the present invention.

DETAILED DESCRIPTION OF THE DRAWINGS

Figure 1:
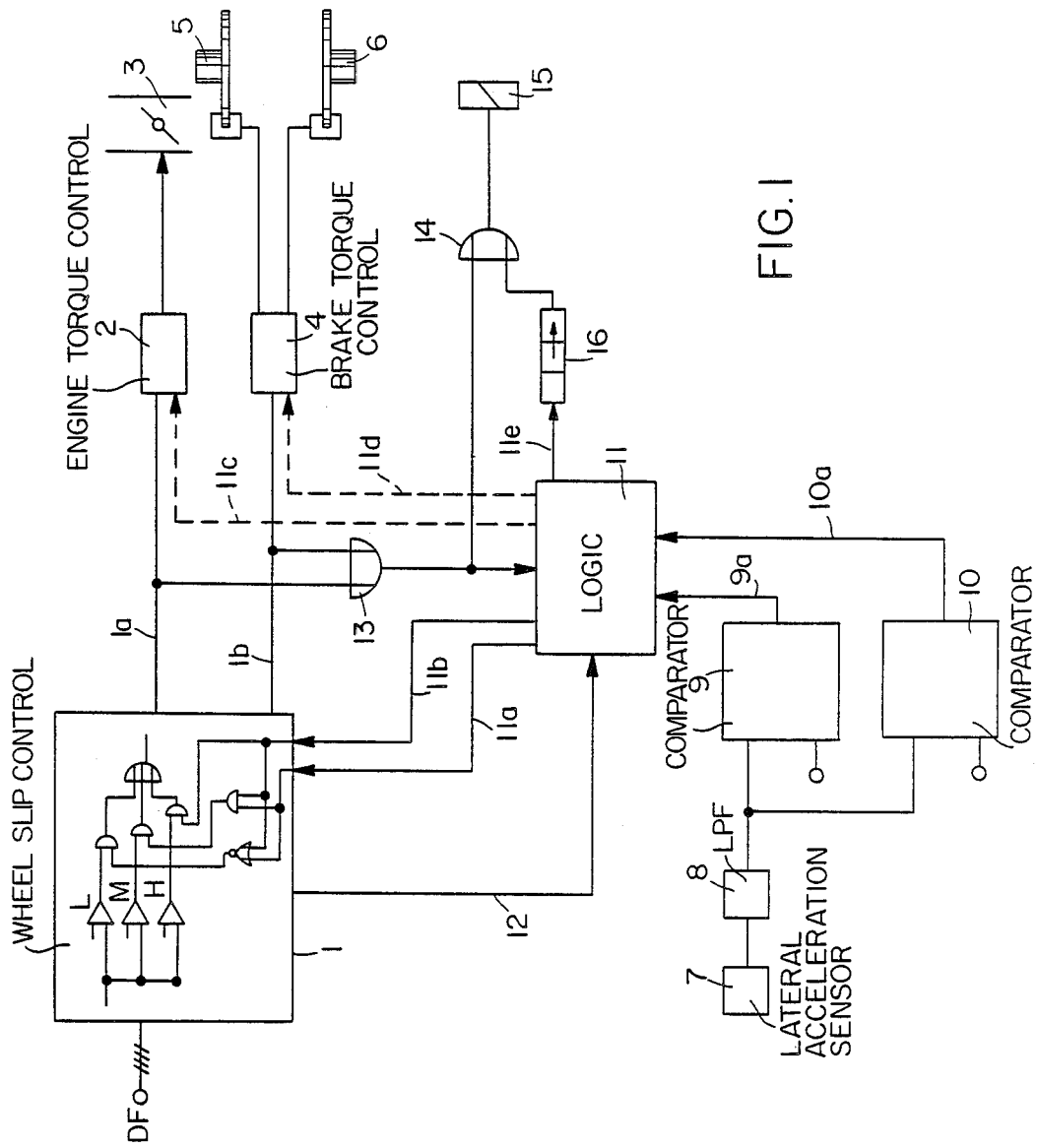
Figure 3:
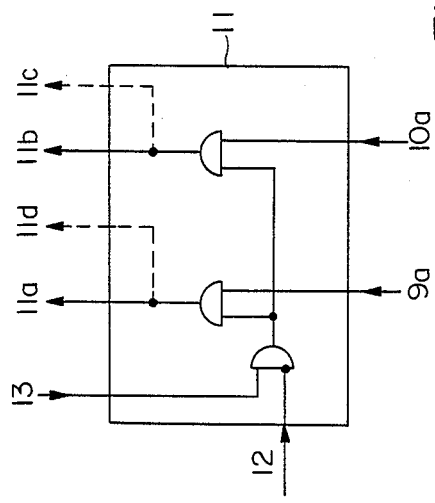
Figure 4:
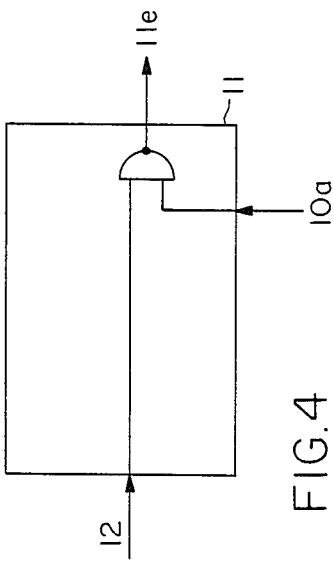
Figure 2:
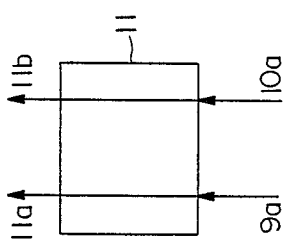

In the drawing, the known wheel slip control system is shown in diagram form and only to the extent that it is required for being understandable. The box 1 receives as input signals the wheel speed signals, determined by wheel speed sensors DF. The electronic system for the wheel slip control ("ASR") is housed in box 1. described in the following, it is shown separately. An output signal affects a torque control means 2 that, in the sense of a power reduction, affects the control element, in this case shown as a throttle valve 3, of the vehicle engine that is not shown.

Another output signal affects a braking torque regulator 4 that controls the braking force at the driven wheels 5 and 6 that tend to spin.

It is assumed that the method of operation of the ASR is known. It is described in detail in DE-PS No. 31 27 302.

A steering angle sensor 7 connected as one input to a steering angel comparator 8, that is set to an indicated threshold value of, for example, 30° by its other input, are part of the ASR electronic system. A longitudinal acceleration sensor 9 connected as an input to two steering angle comparators 10 and 11 that are set to different threshold values of the longitudinal acceleration are also part of the ASR system. It is assumed that in this case the comparator 10 is adjusted to a value of 0.1 g and the comparator 11 to a value of 0.3 g at their other inputs.

The output signals 8a of the steering angle comparator 8 (8a=H, if the steering angle >30°) and output signals to 10a, 11a of the two longitudinal acceleration comparators (10a=H, if the longitudinal acceleration >0.1 g; 11a=H, if the longitudinal acceleration >0.3 g) are fed to a logic circuit 12. This logic circuit 12 also receives an output signal 1c from a driving speed comparator contained in the ASR electronic system that is not shown (1c=H, if the driving speed is, for example, >20 km/h) and via an OR-gate 13, a signal that is called an "ASR-signal". The OR-gate, via its inputs, is connected with the lines carrying the output signals 1a, 1b of the ASR electronic system and will generate an output signal in every case that a control signal 1a is present for the engine torque regulator 2 or 1b for the braking torque regulator 4.

In the logic circuit 12, an AND-NOT gate 15 is provided to the non-inverting input of which, the output signal 10a of the longitudinal acceleration comparator 10 (0.1 g) is fed, and to the inverting input of which, the output signal 11a of the longitudinal acceleration comparator 11 (0.3 g) is fed. The AND-NOT gate 15 will therefore emit an H output signal 15a when a signal 10a, but no signal 11a is present, i.e., when the longitudinal acceleration is between 0.1 g and 0.3 g. The AND-NOT gate 15, in combination with comparators 10 and 11, form a window detector.

The output signal 15a is fed to an input of an AND-gate 14 that has a total of four inputs. The other three inputs are the driving speed signal 1c, the output signal 8a of the steering angle comparator 8 and the ASR-signal 13a. The AND-gate 14 therefore emits an H output signal 14a when the following conditions are present at the same time:

(1) the driving speed >20 km/h,
(2) the steering angle >30°,
(3) the longitudinal acceleration is between 0.1 g and 0.3 g, and
(4) an ASR-signal is present.

The output signals 8a and 15a are also fed to the inputs of another AND-gate 17 contained in the logic circuit 12. The AND-gate 17 emitting an H output signal 17a, if (1) the steering angle >30° and
(2) the longitudinal acceleration >0.3 g.

The two output signals 14a and 17a of the respective AND-gates are fed to the ASR electronic unit 1. In the ASR electronic system, three slip comparators are assigned to each driven wheel. One group is shown to include a slip comparator being adjusted to a medium slip threshold (M), to a slip threshold that is comparatively lower (L) and to a slip threshold that is comparatively higher (H). These slip threshold values are formed in a known way from the values obtained by means of the wheel speed sensors DF and are fed to the compare inputs of the comparators. The speed of the assigned wheel is compared with these values.

As a function of the output signals 14a and 17a of the logic circuit 12, in each case, one of these three slip comparators is actuated, namely:

(a) the comparator (M) with the medium slip threshold is actuated when none of the two output signals is present (14a=L and 17a=L);

(b) the comparator (L) with the lower slip threshold is actuated when the output signal 14a is present (14a=H); and (c) the comparator (H) with the higher slip threshold is actuated when the output signal 17a is present (17a=H).

In the logic circuit 12, a third AND-gate 16 having three inputs is also provided to which the driving speed signal 1c, the output signal 11a of the longitudinal acceleration comparator 11 and the ASR-signal are fed. This AND-gate 16 emits an H output signal 16a when the following conditions are present at the same time:

(1) the driving speed >20 km/h;
(2) the longitudinal acceleration >0.3 g; and
(3) an ASR-signal is present.

The output signal 16a of AND-gate 16 is fed to arrangements shown by interrupted lines that are integrated into the engine torque regulator 2 and into the braking torque regulator 4 and are therefore not shown.

When the control signals 1a or 1b are present, the engine torque is lowered rapidly and the braking pressure of the concerned wheel is built up rapidly, respectively. After a possible halt phase after the cessation of the control signal, the engine torque is raised again at a certain relatively slow restoring speed, and the braking pressure is reduced again. This is an advantage in the case of a low adhesion coefficient, i.e., in the case of a low longitudinal acceleration, because then the wheel or the wheels, with a low torque excess, can again be led to the stability limit. In the case of a higher longitudinal acceleration, thus when the output signal 16a occurs, the restoring speed is switched to a higher value by means of the arrangement integrated into the torque regulators 2 and 4, because in this case, also in powerful engines, the excess moment is not too high. Thus, the engine torque is raised again more rapidly and the braking pressure is lowered more rapidly.

By means of this control of the slip thresholds and of the raising and restoring speeds of the torque regulators that depends essentially on the longitudinal acceleration and the steering angle, a significant refining of the control is possible as well as an optimizing with respect to propulsion force in straight-ahead driving and with respect to lateral stability when driving turns.

Although the present invention has been described and illustrated in detail, it is to be clearly understood that the same is by way of illustration and example only, and is not to be taken by way of limitation. The spirit and scope of the present invention are to be limited only by the terms of the appended claims.

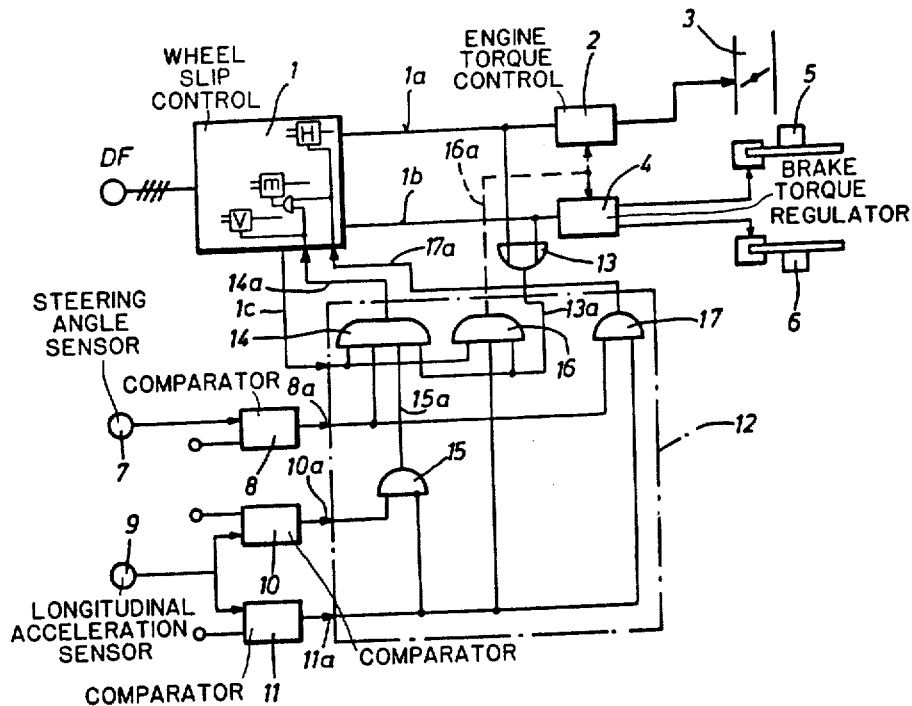

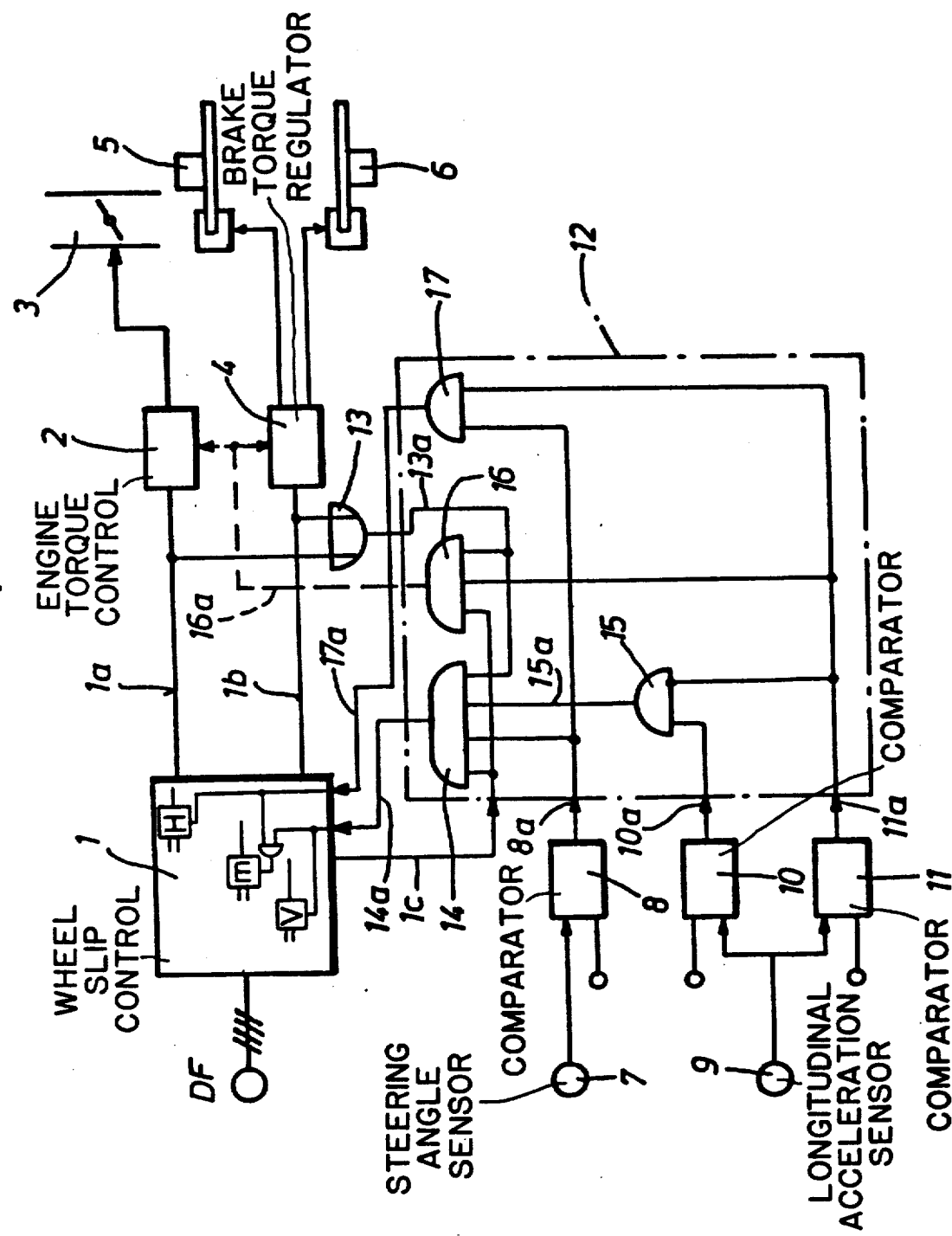

What is claimed:

1. In a propulsion control system for a motor vehicle for preventing an undesirable spinning of driven vehicle wheels, having a plurality of wheel sensor means for providing a signal indicative of the speed of the vehicle wheels, having slip means for determining the slip of the driven vehicle wheels from said signals of said sensor means, having a first slip comparator means for each driven vehicle wheel for comparing the driven wheel speed to a first indicated threshold value and providing an output signal when the first threshold is exceeded, having means for actuating a control element to reduce the output torque of an engine of the vehicle in response to an output signal indicative of at least one of the driven wheels of the vehicle tends to spin, having a vehicle speed comparator means for comparing vehicle speed to a third indicated threshold value and providing an output signal when the third threshold is exceeded, having a determining means for determining the longitudinal acceleration of the vehicle, having a longitudinal acceleration comparator means for comparing said longitudinal acceleration to a second indicated threshold value and providing an output signal when the second threshold is exceeded, having a steering angle sensor means for sensing steering angle and, having a steering angle comparator means for comparing said steering angle to a fourth indicated threshold value and providing an output signal when the fourth threshold is exceeded, the improvement comprising:

two additional slip comparator means each for comparing the associated driven wheel speed to indicated threshold values, one of which has a lower and one has a higher threshold value with respect to said first indicated threshold value for each driven vehicle wheel and providing an output signal when the respective threshold is exceeded;

an additional longitudinal acceleration comparator means for comparing said longitudinal acceleration to an indicated higher threshold value with respect to said second indicated threshold and providing an output when the higher threshold is exceeded; and a logic means for selectively enabling one of said first slip and said two additional slip comparator means in response to predetermined combinations of:

(a) said output signal from the vehicle speed comparator means, (b) said output signal from one of the longitudinal acceleration comparator means, (c) said output signal from the steering angle comparator means as well as said input signal to the actuating means for the control element affecting the engine torque.

2. A system according to claim 1, wherein said logic means enables the additional slip comparator means with the lower threshold value when output signals are simultaneously present from the vehicle speed comparator means, from the longitudinal acceleration comparator means with the higher threshold value and not from the longitudinal acceleration comparator means with the second indicated threshold value, from the steering angle comparator means and said input signal to said actuating means.

3. A system according to claim 1, wherein the logic means enables the additional slip comparator means with the higher threshold value when output signals are simultaneously present from the steering angle comparator means and from the longitudinal acceleration comparator means with the higher threshold value.

4. A system according to claim 1, wherein the logic means enables the first slip comparator means with the first threshold value when on enabling signal is present for one of the two additional slip comparator means.

5. A system according to claim 1, including:

means for actuating the wheel brake of individual driven wheels that tend to spin; and said logic means selectively enables one of said first and said two additional slip comparator means per vehicle driven wheel, if, in addition to the input signal to the actuating means for the control element affecting the engine torque, an input signal to the actuation means for the wheel brakes of the driven vehicle wheels is present.

6. A system according to claim 5, wherein said logic means enables the additional slip comparator means with the lower threshold value when output signals are simultaneously present from the vehicle speed comparator means, from the longitudinal acceleration comparator means with the higher threshold value and not from the longitudinal acceleration comparator means with the second indicated threshold value, from the steering angle comparator means and from the steering angle comparator means and said input signal to at least one of said actuating means.

7. A system according to claim 5, wherein the logic means actuates the slip comparator means with the higher threshold value when output signals are simultaneously present from the steering angle comparator means and from the longitudinal acceleration comparator means with the higher threshold value.

8. A system according to claim 7, wherein the logic means enables the first slip comparator means with the first threshold value when no enabling signal is present for one of the two additional slip comparator means.

9. A system according to claim 5, wherein the logic means actuates the slip comparator means with the higher threshold value when output signals are simultaneously present from the steering angle comparator means and from the longitudinal acceleration comparator means with the higher threshold value.

10. A system according to claim 2, wherein the logic means enables the additional slip comparator means with the higher threshold value when output signals are simultaneously present from the steering angle comparator means and from the longitudinal acceleration comparator means with the higher threshold value.

11. A system according to claim 10, wherein the logic means enables the first slip comparator means with the first threshold value when no actuating signal is present for one of the two additional slip comparator means.

12. A system according to claim 5, including means actuated by the logic means if output signals are simultaneously present from the vehicle speed comparator means and from the longitudinal acceleration comparator means having the higher threshold value for changing rate of the brake pressure change in the wheel brakes and adjusting speed of the power control element of the vehicle engine.

13. A system according to claim 5, wherein the logic means enables the first slip comparator means with the first threshold value when no enabling signal is present for one of the two additional slip comparator means.

14. A system according to claim 8, including means enabled by the logic means if output signals are simultaneously present from the vehicle speed comparator means and from the longitudinal acceleration comparator means having the higher threshold value for changing rate of the brake pressure change in the wheel brakes and adjusting speed of the power control element of the vehicle engine.

15. A system according to claim 9, including means enabled by the logic means if output signals are simultaneously present form the vehicle speed comparator means and from the longitudinal acceleration comparator means having the higher threshold value for changing rate of the brake pressure change in the wheel brakes and adjusting speed of the power control element of the vehicle engine.

16. A system according to claim 13, including means enabled by the logic means if output signals are simultaneously present from the vehicle speed comparator means and from the longitudinal acceleration comparator means having the higher threshold value for changing rate of the brake pressure change in the wheel brakes and adjusting speed of the power control element of the vehicle engine.

* * * * *

UNITED STATES PATENT AND TRADEMARK OFFICE
CERTIFICATE OF CORRECTION

PATENT NO. : 4,763,262

DATED : August 9, 1988

INVENTOR(S) : Heinz Leiber

It is certified that error appears in the above-identified patent and that said Letters Patent is hereby corrected as shown below:

The title page showing the illustrative figure should be deleted to appear as per attached title page.

The sheets of drawings should be deleted to be replaced with the following sole Figure.

Signed and Sealed this

Twenty-seventh Day of October, 1992

Attest:

DOUGLAS B. COMER

Attesting Officer

Acting Commissioner of Patents and Trademarks

United States Patent [19]

Leiber

[11] Patent Number: 4,763,262
[45] Date of Patent: Aug. 9, 1988

[54] PROPULSION CONTROL USING LONGITUDINAL ACCELERATION, STEERING ANGLE, AND SPEED TO SELECT SLIP THRESHOLD

[75] Inventor: Heinz Leiber, Oberriexingen, Fed. Rep. of Germany

[73] Assignee: Daimler-Benz Aktiengesellschaft, Stuttgart, Fed. Rep. of Germany

[21] Appl. No.: 943,693

[22] Filed: Dec. 19, 1986

[30] Foreign Application Priority Data

Dec. 21, 1985 [DE] Fed. Rep. of Germany ...... 3545652

[51] Int. Cl.⁴ .................................................. B60T 8/32
[52] U.S. Cl. ................................. 364/426; 180/197; 303/100
[58] Field of Search ..................... 364/426, 431.07; 180/197; 361/238; 303/95, 97, 100

[56] References Cited

U.S. PATENT DOCUMENTS

| | | | |
|---|---|---|---|
| 3,910,647 | 10/1975 | Takeuchi | 180/197 |
| 4,036,536 | 7/1977 | Quon | 303/97 |
| 4,042,059 | 8/1977 | Bertolasi | 303/100 |
| 4,484,280 | 11/1984 | Brugger et al. | 364/426 |
| 4,511,014 | 4/1985 | Makita | 180/197 |
| 4,657,313 | 4/1987 | Fennel et al. | 303/100 |

*Primary Examiner*—Gary Chin
*Attorney, Agent, or Firm*—Barnes & Thornburg

[57] ABSTRACT

A propulsion control system for motor vehicles for preventing an undesirable spinning of the driven vehicle wheels when their slip exceeds a certain threshold value, having several slip thresholds that are connected or disconnected by a logic circuit as a function of the vehicle speed, the longitudinal acceleration, the steering angle and control signals of the propulsion control. The logic circuit may also be used for changing the rising and adjusting speeds of the control elements of the propulsion control.

16 Claims, 1 Drawing Sheet